United States Patent [19]

Kishi et al.

[11] Patent Number: 5,414,461
[45] Date of Patent: May 9, 1995

[54] VEHICLE NAVIGATION APPARATUS PROVIDING SIMULTANEOUS FORWARD AND REARWARD VIEWS

[75] Inventors: Norimasa Kishi; Masayuki Takada, both of Kanagawa, Japan

[73] Assignee: Nissan Motor Co., Ltd., Yokohama, Japan

[21] Appl. No.: 974,890

[22] Filed: Nov. 12, 1992

[30] Foreign Application Priority Data

Nov. 15, 1991 [JP] Japan .................. 3-326962

[51] Int. Cl.⁶ .............................................. H04N 7/18
[52] U.S. Cl. ................................. 348/115; 348/118; 348/121; 345/7
[58] Field of Search .................. 358/108, 103; 345/7, 345/8; H04N 7/18; 348/113, 115, 117, 118, 121, 123, 124

[56] References Cited

U.S. PATENT DOCUMENTS

| | | | |
|---|---|---|---|
| 3,945,716 | 3/1976 | Kinder | 345/7 |
| 4,028,725 | 6/1977 | Lewis | 358/103 |
| 4,613,216 | 9/1986 | Herbec et al. | 350/618 |
| 4,908,611 | 3/1990 | Iino | 345/7 |
| 4,977,401 | 12/1990 | Sjöberg | 340/975 |
| 4,999,012 | 3/1991 | Suzuki et al. | 353/14 |
| 5,013,135 | 5/1991 | Yamamura | 345/7 |
| 5,027,200 | 6/1991 | Petrossian | 358/103 |
| 5,051,735 | 9/1991 | Furukawa | 358/103 |
| 5,091,719 | 2/1992 | Beamon | 345/8 |
| 5,093,567 | 3/1992 | Staveley | 345/8 |
| 5,121,200 | 6/1992 | Choi | 358/108 |
| 5,243,417 | 9/1993 | Pollard | 358/108 |

FOREIGN PATENT DOCUMENTS

| | | | |
|---|---|---|---|
| 1396129 | 12/1965 | France | 358/108 |
| 0008729 | 1/1981 | Japan | 358/108 |
| 0210787 | 12/1982 | Japan | 358/108 |
| 60-179357 | 9/1985 | Japan . | |
| 60-177580 | 11/1985 | Japan . | |
| 62-57392 | 3/1987 | Japan . | |
| 335448 | 9/1930 | United Kingdom . | |
| 1155807 | 6/1969 | United Kingdom | 358/108 |
| 2161668 | 1/1986 | United Kingdom | 358/108 |

OTHER PUBLICATIONS

United States Statutory Invention Registration, H779, May 1990, Verona.

Hirose et al., "A Study for Modification of Actual Environment by See-Through HMD," 6th Symposium on Human Interface, Oct. 24-26, 1990, Tokyo.

Primary Examiner—Tommy P. Chin
Assistant Examiner—Bryan S. Tung
Attorney, Agent, or Firm—Foley & Lardner

[57] ABSTRACT

In an apparatus for controllably supplying visual information for a viewer, an optical system including ocular glasses corresponding to right and left eyes of the driver (viewer) is provided so that images on a pair of liquid crystal televisions are introduced to the pair of ocular glasses to provide a three-dimensional solid image. Two television cameras are installed on a vehicle so as to be faced in the rearward direction with their bodies juxtaposed to each other. When the vehicle is reversed, a reflectivity of a half mirror is maximized so that a rearward scenery can be viewed via the ocular glasses in the form of a solid image. During the forwarding of the vehicle, a forward field of view is produced for a half mirror with a transmissivity of the half mirror maximized.

17 Claims, 9 Drawing Sheets

VEHICLE NAVIGATION APPARATUS PROVIDING SIMULTANEOUS FORWARD AND REARWARD VIEWS

BACKGROUND OF THE INVENTION

1. Field of The Invention

The present invention relates generally to an apparatus for supplying a visual information which produces selectively different images of visual information.

2. Description of The Background Art

Various types of visual information supplying apparatuses have been proposed.

One of the previously proposed visual information supplying apparatuses is applied to a large sized motor bus in which a television camera to photograph a rear view of field and its monitor television to reproduce the photographed image are mounted.

When a switch ON (or OFF) signal is input from a switching device, a control unit controls a visual image on the television monitor derived from the television camera so that the display of the image on the monitor is turned on or off. At this time, a distance display auxiliary line to indicate a pseudo or virtual distance of, e.g., a white line in a rear view of field is superimposed on the image screen of the monitor, for example, in a form of a white line segment in order to provide a depth perception of the rear field of view for a viewer.

However, in the previously proposed visual information supplying apparatus, a plane image screen of the monitor which only provides the image information is viewed in the form of a two dimensional image and the distance displaying auxiliary line is generally set with a scale mated with a road segment image. Therefore, it is difficult to provide the distance information for the viewer when a human kind image, vehicle, or some other object images is superimposed on a front scenery portion of the auxiliary line.

Particularly, on a complicated scenery wherein various objects are present, it is not easy to provide a depth of perception and distance feeling immediately for the viewer.

On the other hand, when the viewer views a front scenery of the motor bus, it is necessary to separate his viewed angle from the image screen of the monitor to transfer a line of sight toward the front portion thereof. Therefore, the viewer, i.e., a vehicle driver needs to move his head and eyes intermittently and becomes tiresome.

Then, in order to produce the distance information which is easily recognizable, a visual information supplying apparatus of a head up display type has been proposed in a Japanese Paper of Sixth Human Interface Symposium Documents (Tokyo University, Hirose, 1990).

In this Japanese Paper, the information supplying apparatus produces a computer graphic image superimposed on the front scenery. However, it is difficult to identify the computer graphic image from the produced front scenery.

SUMMARY OF THE INVENTION

It is, therefore, a principal object of the present invention to provide an apparatus for supplying visual information which can produce two mutually different visual images without change in the line of sight, and can provide easy and accurate grasping for a distance viewed from its viewer.

The above-described object can be achieved by providing a visual information supplying apparatus, comprising: a) first providing means for providing a first visual information; b) first displaying means for displaying the first visual information in a form of a first image; c) second providing means for providing a second visual information including the visual information for one eye of a human kind and for the other eye of the human kind; d) second displaying means for displaying the second visual information in the form of a three dimensional second image; e) producing means capable of producing both first and second images solely or superimposing on each other for a viewer; f) switching signal generating means for generating and outputting a switching signal depending on which one of the first and second images is selected to be displayed on the producing means; and g) image controlling means for controlling the producing means so as to selectively produce either or both of the first and second image for the viewer on the basis of the switching signal.

The above-described object can also be achieved by providing a visual information supplying apparatus for a vehicle, comprising: a) first visually displaying means for displaying a first visual information in a form of a first image against eyes of a viewer, the first visual information being front scenery with respect to a vehicle body via a front windshield of the vehicle; b) second visually displaying means for displaying second visual information in a form of a second three dimensional image against the eyes of the viewer, the second visual information being provided for the second displaying means including visual information for his right eye and that for his left eye and being an outer scenery except the front scenery; c) guiding means for selectively guiding either the first image from the first visually displaying means or second image from the second visually displaying means to the viewer; d) switching signal generating means for generating and outputting a switching signal depending on which one of the first and second images is selected to be guided through the guiding means; and f) image controlling means for controlling the guiding means so as to selectively guide either the first image or second image to the viewer on the basis of the switching signal.

The above-described object can also be achieved by providing a visual information supplying apparatus for a vehicle, comprising: a) first visually displaying means for displaying first visual information in a form of a first image against eyes of a viewer, the first visual information being front scenery with respect to a vehicle body via a front windshield of the vehicle; b) second visually displaying means for displaying second visual information in a form of a second three dimensional image against the eyes of the viewer, the second visual information being provided for the second displaying means including visual information for his right eye and that for his left eye and being an outer scenery except the front scenery; c) guiding means for selectively guiding both of the first image from the first visually displaying means and second image from the second visually displaying means to the viewer in the form of the first image with a part of which the second image superimposed; d) switching signal generating means for generating and outputting a switching signal depending on which one of the first and second images is selected to be guided through the guiding means; and f) image controlling means for controlling the guiding means so as to selectively guide such that the first image is wholly viewed from said guiding means or the first image is partially viewed with the second image superimposed on a remaining part of the first image on the basis of the switching signal.

DESCRIPTION OF THE PREFERRED EMBODIMENTS

Reference will, hereinafter, be made to the drawings in order to facilitate a better understanding of the present invention.

Figure 1:
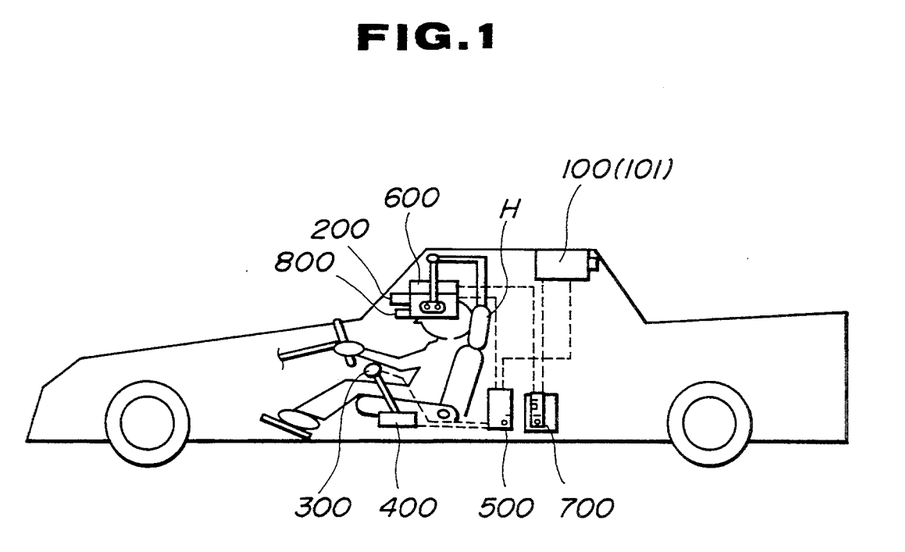
FIG. 1 is an overall view of an apparatus for supplying a visual information in a preferred embodiment according to the present invention.

FIG. 1 is an overall view of an apparatus for supplying visual information in a preferred embodiment according to the present invention.

In FIG. 1, the apparatus generates a second visual information for a three-dimensional second image by means of two sets of television cameras as a vehicle surrounding information supplying apparatus.

As shown in FIG. 1, the two sets of television cameras 100, 101 are mounted on an upper end of a rear window glass (rear wind shield) located approximately near a rear seat of a vehicle compartment. A head-mounted see-through solid image supplying device (hereinafter referred to as an image producing apparatus) 200 is supported on a head rest H of a driver's seat. A switch 300 is attached onto a knob of a shift lever of a power transmission. In addition, a gear position detecting arrangement 400 is installed and associated with a shift lever of the power transmission. On the basis of signals derived from the switch 300 and gear position detecting arrangement 400, an image control unit 500 controls the image producing apparatus 200 so as to selectively produce video images as will be described later.

Furthermore, a head position detecting arrangement 600 is installed together with the image producing apparatus 200 to detect a movement of a head of a driver. On the basis of the signal derived from the head position detecting arrangement 600, a camera position control unit 700 is installed to rotate the television cameras 100, 101. The image producing apparatus 200 is supported on a head rest H via the head position detecting arrangement 600.

It is noted that numeral 800 denotes an illuminane photometer (used as a brilliance sensor) as will be described later.

Figure 2:
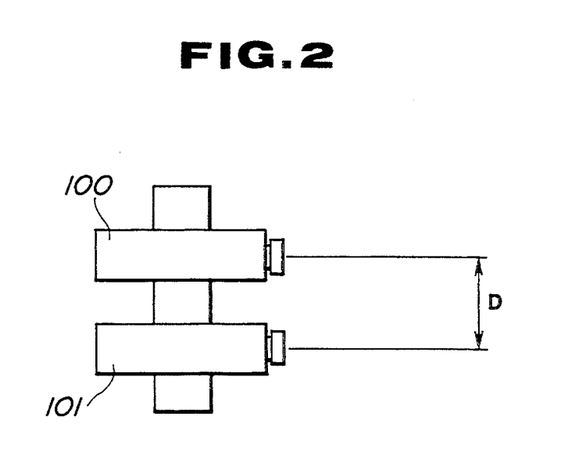
FIG. 2 is a top view of a pair of video cameras arranged in a vehicle shown in FIG. 1.

The television cameras 100, 101 are mounted in parallel to each other so as to face toward a rear portion of the vehicle, or toward a required monitoring range, thus toward a lateral side portion of the vehicle and are integrally rotatable. An interval distance D between the television cameras 100, 101 is set to provide the same distance (or slightly longer distance than) as that between usual left and right eyesballs of the driver. The visual image signals derived from the television cameras 100, 101 are supplied to the image producing apparatus 200 via the image control unit 500.

Figure 3:
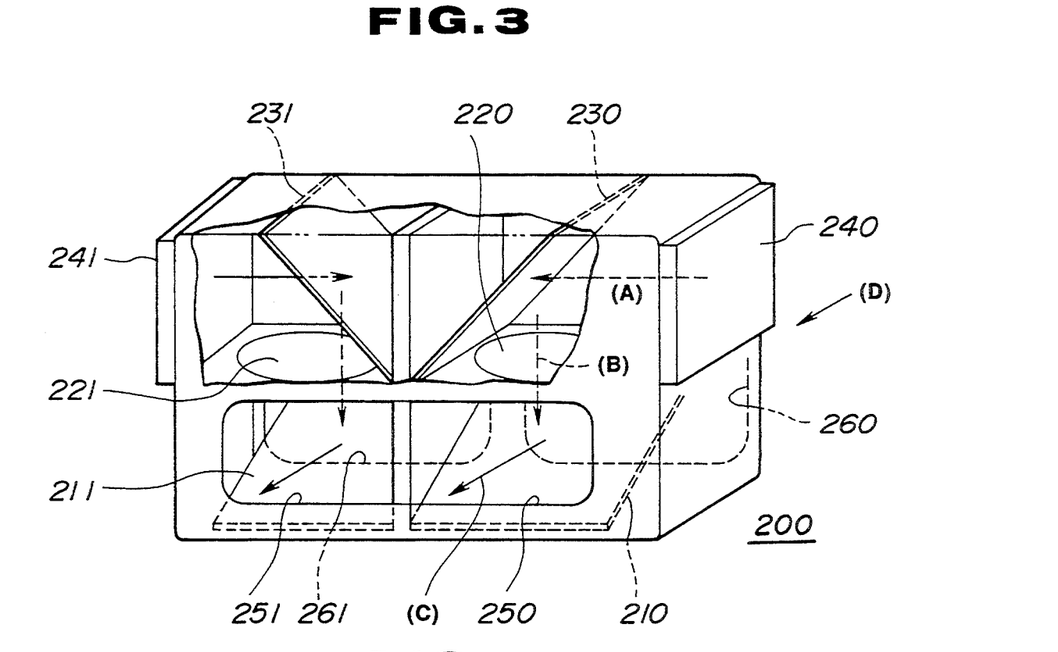
FIG. 3 is a partially cross sectioned perspective view of an optical system used in the visual information supplying apparatus shown in FIG. 1.
Figure 4:
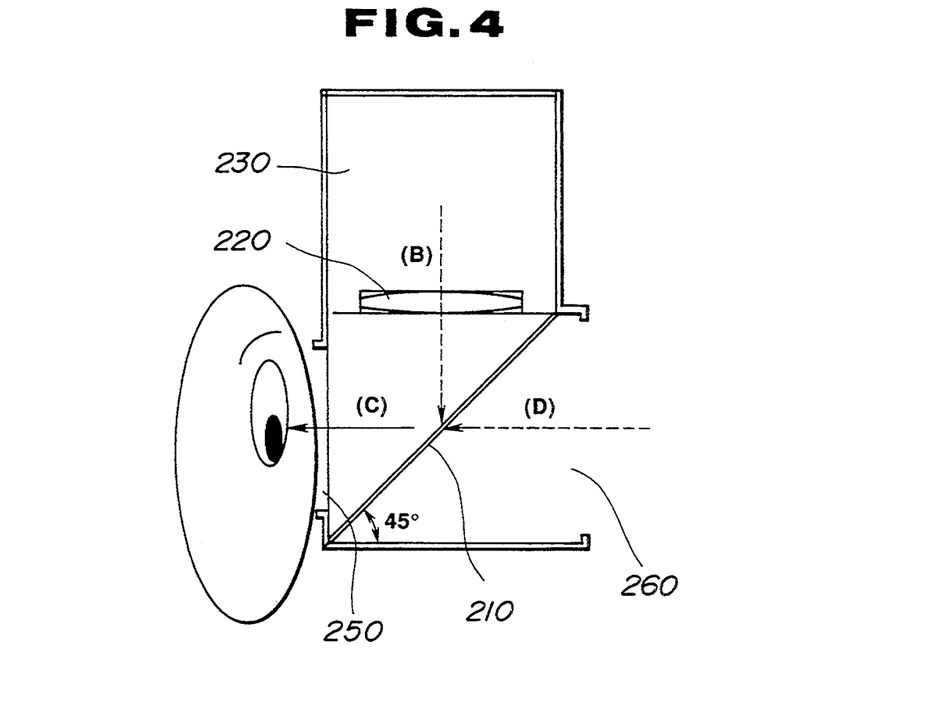
FIG. 4 is a laterally cross sectioned view of the optical system in the preferred embodiment according to the present invention shown in FIGS. 1 through 3.

Next, a structure of the image producing apparatus 200 is shown in Figs. 3 and 4.

FIG. 4 shows an arrangement angle of a mirror off the image producing apparatus 200, particularly a right eye corresponding portion.

Figure 5:
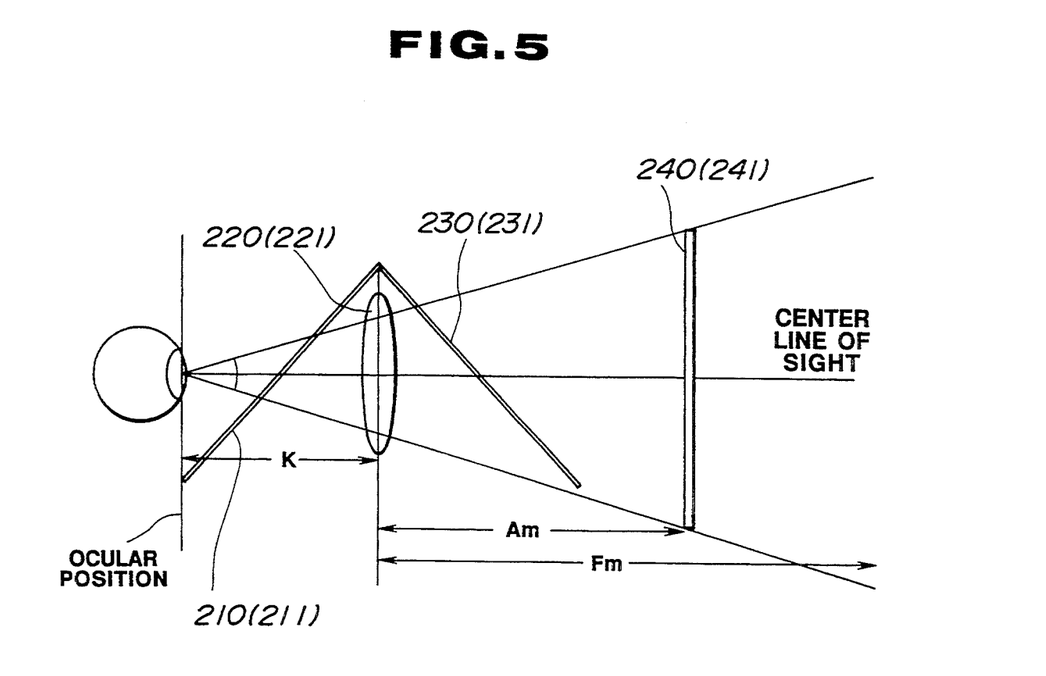
FIG. 5 is an explanatory view of the optical system used in the visual information supplying apparatus shown in FIG. 1.

Half mirrors 210, 211 having functions to vary their transmissivities according to applied drive voltages are installed on a depth limit of right eye piece window 250 and left eye piece window 251, respectively. As shown in FIG. 5, the mirrors 280, 281 are interposed between convex lens 220, 221 and liquid crystal televisions 240, 241, respectively. The screens of the liquid crystal televisions 240, 241 are arranged with their side surfaces faced against the mirrors 280, 231.

The mirror 230 is arranged so as to provide a viewed angle of 45 degrees with respect to the displayed image screen so that a displayed image of the liquid crystal television 240 can be reflected toward a lateral direction (A) to a downward direction (B). The half mirror 210 is inclined at 45° with respect to the convex lens 220 so that the reflected image is reflected in a direction of (C) directing the eye of the driver at an eyepiece window (also called ocular window) 250 from the direction of (B). A transparent window (also called combining glass) 260 is installed on an extension line opposite to the direction of (C) so that a front field of view enters as the line of (D). For the left eye corresponding portion, a transparent window (also called combining glass) 261 is installed.

FIG. 5 shows an optical system of the visual information supplying apparatus.

Suppose that a distance from an eye ball position of the eye piece window 250 to the convex lens 220 (221) is K, a distance from the convex lens 220 (221) to the liquid crystal television 240 (241) is Am, and a focal distance of the convex lens 220 (221) is Fm.

Figure 6:
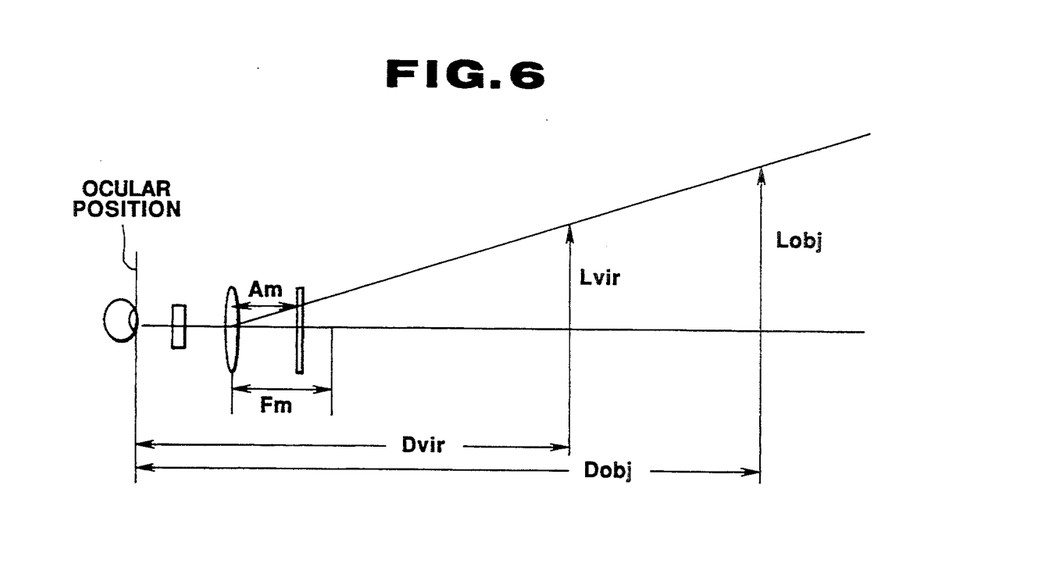
FIG. 6 is an explanatory view of a virtual image and focal distance in the optical system with respect to a corresponding eye ball shown in FIG. 1.

As shown in FIG. 6, suppose a magnitude of the visual image displayed on the liquid crystal television is Ldis, a distance of an object to be actually viewed is Dobj, and its magnitude is Lobj, a virtual image projecting surface is Dvir, and a magnitude of the projected image is Lvir.

The following relationship is established:

$$Am = Ldis \cdot (Dvir - K)/Lvir,$$

$$Fm = Am \cdot (Dvir - K)/((Dvir - K) - Am).$$

On the basis of the above equations, specific design numerical values can be derived.

For example, suppose that Am=250 [mm], k= 100 [mm], Dvir=2000 [mm], it is preferable to use the convex lens having Fm=287.88 [mm]. Dvir may preferably be about 1 meter as the projected position during the vehicle driving.

Figure 7:
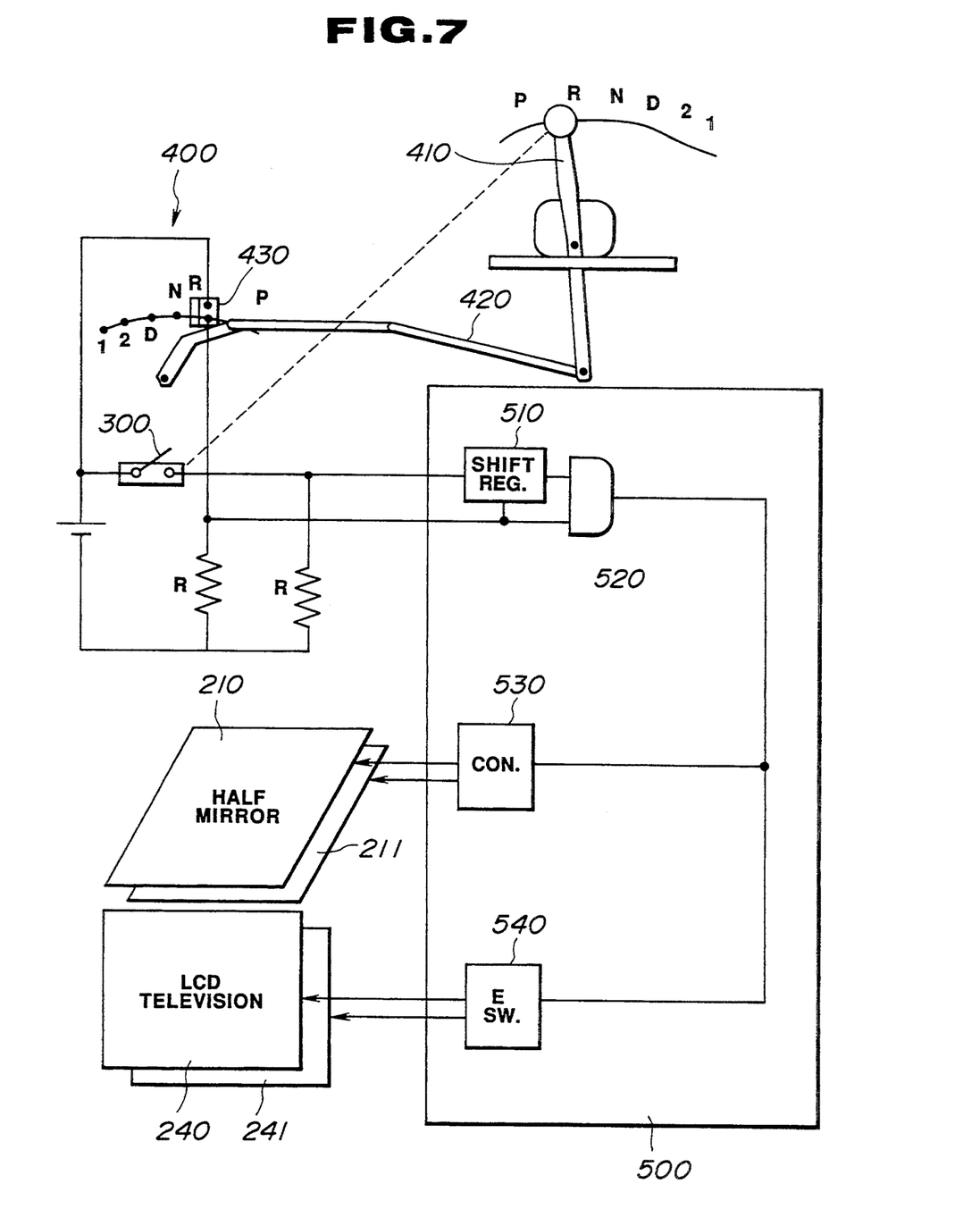
FIG. 7 is a circuit block diagram of an image control unit and switching signal generator shown in FIG. 1.

FIG. 7 shows the circuit block diagram of the image control unit 500.

A switch 300 is constituted by a push button switch disposed on a knob of a shift lever 410 of the power transmission of the vehicle. The gear position detecting apparatus 400 is constituted by a switch 430 which is turned on when a mechanical linkage 420 of the shift lever 410 causes the switch 430 to turn on with the shift lever 430 selected at a reverse position R. When the switch 430 is turned off, a selection mode of the shift lever 410 is any one of the other positions except the reverse position.

The image control unit 500 is reset upon detection of a rising edge of an ON signal of the switch 430 on the basis of the output signal of the gear position detecting arrangement 400. The image control unit 500 is provided with a shift register 510 which outputs the ON signal and switches the ON signal to an OFF signal whenever it detects a rising edge of the ON signal of the switch 300. In addition, the image control unit 500 is provided with an AND gate circuit 520 which receives both output signals from the shift register 510 and from the gear position detecting arrangement 400. An output signal of the AND gate circuit 520 is supplied to both transmissivity control block 530 and electronic switch 540, both block and switch being installed for the half mirrors 210, 211 and liquid crystal televisions 240, 241.

When the output signal of the AND gate circuit 520 indicates ON, the transmissivity control block 530 interrupts drive voltages supplied to the half mirrors 210, 211 so that their reflectivities are maximized and their transmissitivities are minimized. When the output signal of the AND gate circuit 520 indicates OFF, the drive voltages, in turn, are supplied to the half mirrors 210, 211 so that their transmissivities are maximized and their reflectivities are minimized.

Then, the electronic switch 540 turns on and off the power supply of the liquid crystal televisions 240, 241 in accordance with the ON and OFF of the output signal of the AND gate circuit 520, respectively.

When the shift lever 410 is selected at the Reverse position R, a vehicular rearward scenery photographed by means of the television cameras 100, 101 is displayed on the liquid crystal televisions 240, 241 in the image producing apparatus 200. The displayed image thereon is projected on the position Dvir by means of the half mirrors 210, 211 on which the reflectivities are maximized. On the other hand, when the switch 300 is turned on or the shift lever 410 is placed at any one of the other positions except the reverse position, the transmissivities of the half mirrors 210, 211 are maximized so that the driver can view directly a forward scenery through the combining glasses 260, 261. At this time, the screens of the liquid crystal televisions 240, 241 are turned off.

Then, the image control unit 500 carries out the image producing such that the image photographed by means of the right television camera 101 as viewed from the rear direction of the vehicle is displayed on the liquid crystal television 240 for the right eye so as to s0 produce its image to the driver's right eye and the image photographed by means of the left television camera 100 is displayed on the liquid crystal television camera 241 For the left eye so as to produce its image to the driver's left eye. Thus, the projected image recognized by the driver provides a three-dimensional solid image and when the vehicle is reversed, the driver can view the rearward scenery as if he drove the vehicle to be forwarded.

Figure 8:
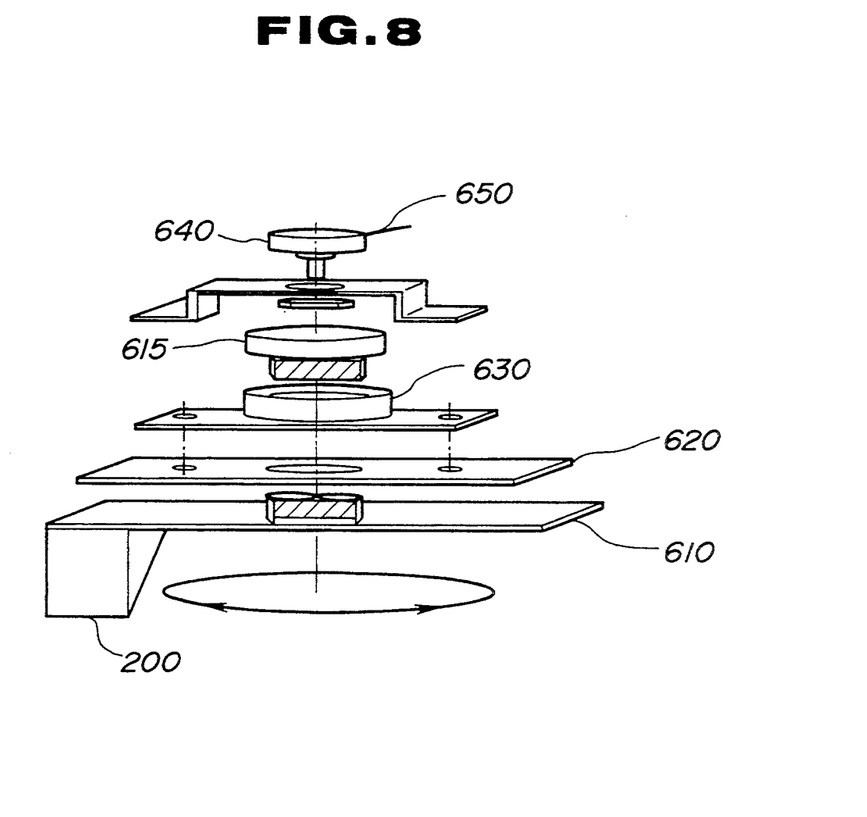
FIG. 8 is an exploded perspective view of a head position detecting arrangement used in the visual information supplying apparatus shown in FIG. 1.

FIG. 8 shows a detailed sketch of the head position detecting arrangement 600.

As shown in FIG. 8, a bearing 630 is attached onto a fixing member 620. A stopper member 615 is associated with a rotating member 610 via the bearing 630. The image producing apparatus 200 is attached onto the rotating member 610. A potentiometer 640 is attached onto the fixing member 620 and is driven by means of the stopper member 615. The fixing member 620 is supported on the head rest H. According to the movement of the head of the driver on which the image producing apparatus 200 is attached, the rotating member 610 is rotated and the potentiometer 640 outputs a voltage 650 varied according to its rotation angle.

Figure 9:
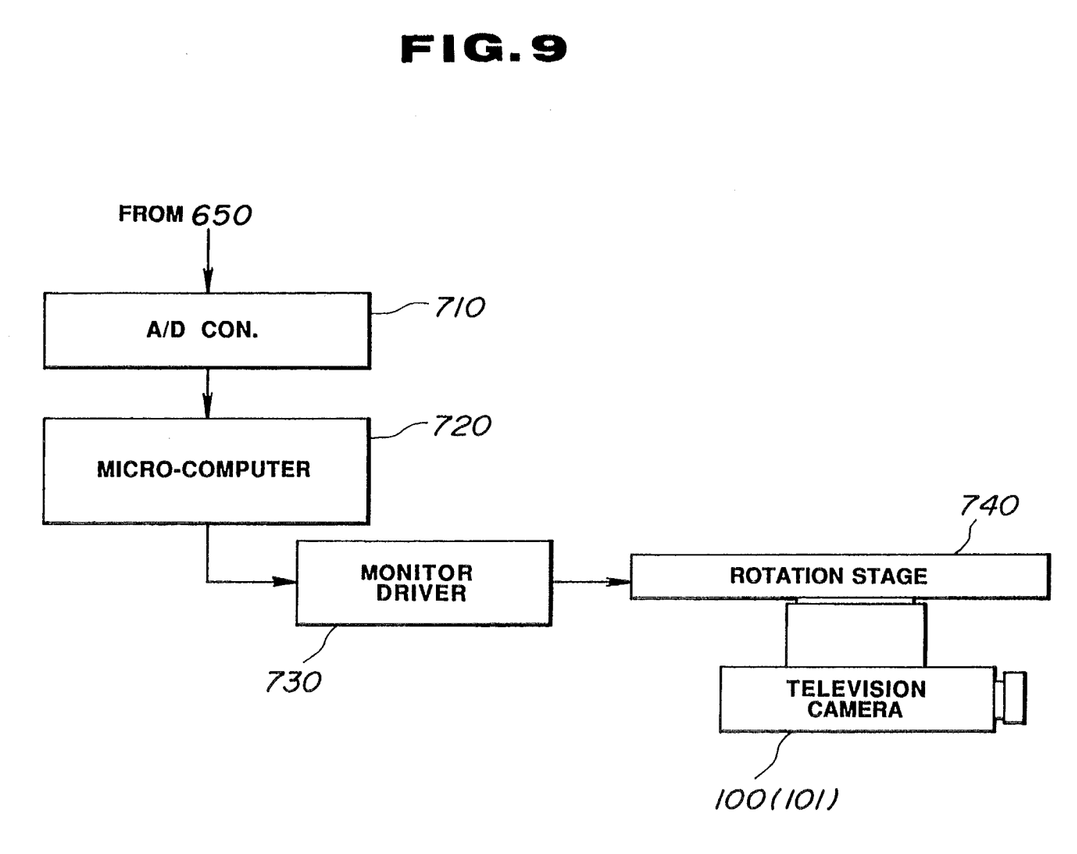
FIG. 9 is a circuit block diagram of a camera position control circuit of the visual information supplying apparatus shown in FIG. 1.

FIG. 9 shows the camera position control unit 700.

The camera position control unit 700 includes an A/D converter 710, a microcomputer 720, and motor driver 730. A rotation stage 740 supporting the television cameras 100, 101 is controllably driven in accordance with the movement of the head of the driver on the basis of the output voltage 650 of the potentiometer 640.

Figure 10:
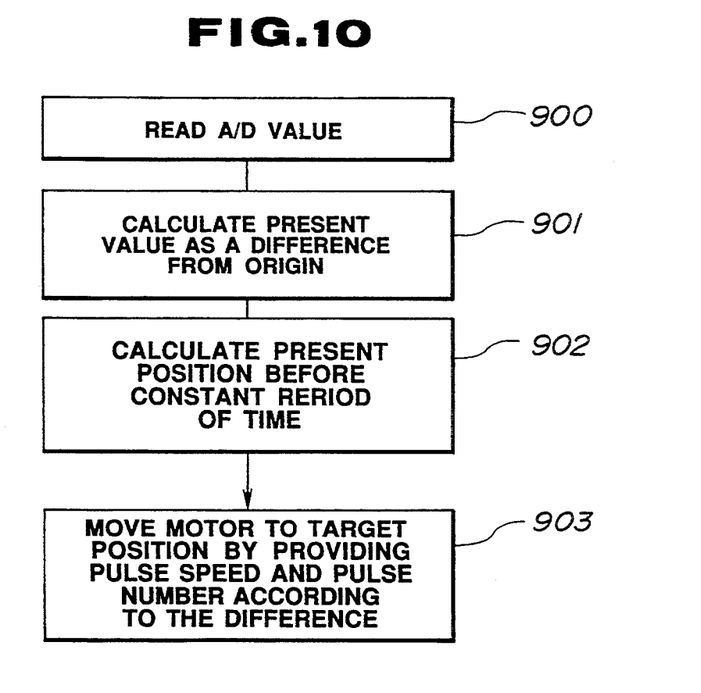
FIG. 10 is an operational flowchart indicating an operation of the camera position control circuit shown in FIG. 9.

After converting the output voltage 650 of the potentiometer 650 into the corresponding digital quantity by means of the A/D converter 710, the microcomputer 720 executes a routine shown in FIG. 10.

That is to say, as shown in FIG. 10, the microcomputer 720 reads a value of A/D conversion of the A/D converter 710 in a step 900.

In a step 901, the microcomputer 720 calculates the present angle value as a difference from an origin.

In a step 902, the microcomputer 720 calculates a difference between the angle before a constant period of time and the present value as a difference up to a target angle.

In a step 903, the microcomputer 720 outputs an operation command including a pulse speed and pulse number to the motor driver 730 according to the difference up to the target angle.

Thus, if the driver, e.g., turns his head right, the television cameras 100, 101 are pivoted in the right direction so that the corresponding rearward scenery can be photographed in accordance with his intention.

In the preferred embodiment, when the driver views the eye-pieces (ocular windows) 250, 251 of the image producing apparatus 200, the driver can be provided for the front view of field through the transparent windows (combining glasses) 260, 261 and half mirrors 210, 211 whose transmissivities are maximized during the forwarding of the vehicle. When the vehicle is reversed without no change in posture, the driver can visually recognize the vehicular rearward scenery as the solid image in the image producing apparatus 200 through the half mirror whose reflectivity is maximized. Consequently, the distance feeling or depth of perception of the visually recognized object can immediately be obtained. At this time, when the head is rotated in the direction desired by the driver to be viewed, the rearward scenery of the corresponding direction can immediately be projected. Therefore, no special operation is required. Then, only when the driver pushes the switch 300 installed on the knob of the shift lever 410, both front view of field and image on the rearward scenery can instantaneously be switched to each other. Consequently, situations of the forward and rearward portions of the vehicle can easily be recognized.

In the preferred embodiment, the optical system is such that the convex lenses 220, 221 are installed near to the half mirrors 210, 211 opposing the liquid crystal televisions 240, 241.

Figure 11:
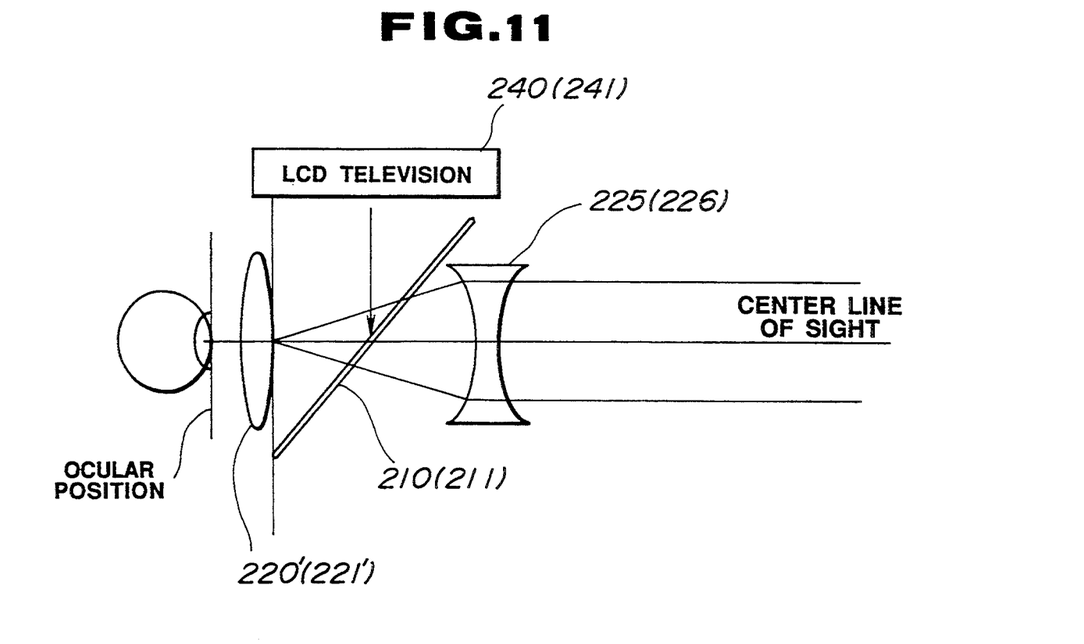
FIG. 11 is an explanatory view of a modification of the optical system shown in FIGS. 3 through 6.

FIG. 11 shows another optical system used in the preferred embodiment shown in FIG. 1.

That is to say, ocular convex lenses 220', 221' are arranged with a possible shortest distance from an eyeball position of the ocular window and concave lenses 225, 226 are installed in front of the half mirrors 210, 211.

In this case shown in FIG. 11, neither mirrors 280, 281 are required. In addition, the liquid crystal televisions 240, 241 are arranged at positions opposing the half mirrors 210, 211. In this case, when both transmissitivities and reflectivities of the half mirrors 210, 211 are switched, both front view of field and rearward scenery images through the screen of the liquid crystal televisions are selectively passed to the ocular windows 2S0, 281.

Alternatively, various type of optical systems can be selected using the combination of the plurality of lenses.

The installed positions of the television cameras 100, 101 are not limited to those recited in the drawings. If the positions are those adjacent to a height off the driver's eyes, e.g., placed out of the vehicle body opposing the rear windshield or placed above a trunk lid, the same solid image having a reality can be obtained.

Furthermore, although liquid crystal shutters whose transmissivities are varied according to the drive voltages are used as the half mirrors 210, 211 having the transmissivities variable functions, mechanical shutters or electrochromics may alternatively be used.

In addition, the head position detecting arrangement 600 and image producing apparatus 200 are supported on the head rest H. The head position detecting arrangement 600 may be suspended from a ceiling portion of the vehicle body.

The camera position control unit 700 is not limited to the rotation within the single plane. It may have multiple freedoms corresponding to the movement of head.

Figure 12:
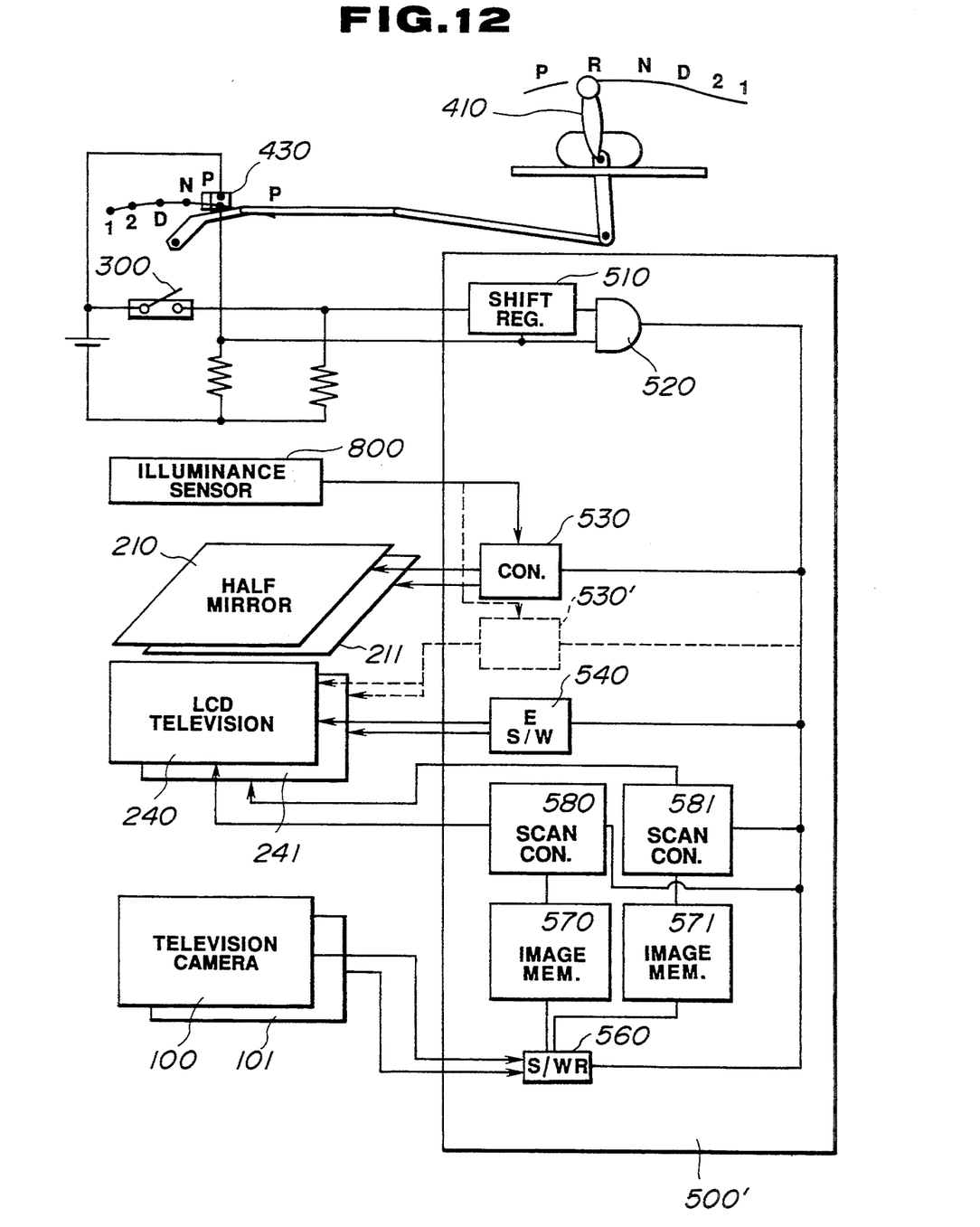
FIG. 12 is a circuit block diagram of an alternative control unit in another preferred embodiment of the visual information supplying apparatus.

FIG. 12 shows another preferred embodiment of the visual information producing apparatus according to the present invention.

The image control unit 500', in the other preferred embodiment, includes: image memories 570, 571 temporarily storing the image information from the television cameras 100, 101; scan converters 580, 581 extracting the required information therefrom; and a switcher 560.

The image control unit 500' includes the transmissitivity control block 530 installed in the image producing apparatus 200 and receiving a signal from the illumination sensor 800. The half mirrors 210, 211 are constituted by the electrochrominics. The transmissitivity control block 580 controls the transmissivitity of the half mirrors 210, 211.

The scan converters 580, 581 extract all informations scanning the whole image memories 570, 571 when the control signal from the AND gate circuit 520 is the ON signal (when the vehicle is reversed). The scan converters 580, 581 supply the video signal to the liquid crystal televisions 240, 241 to display the video image on the whole screens of the televisions 240, 241. The half mirrors 210, 211 have maximized reflectivities in the same way as the previous preferred embodiment.

Figure 13A:
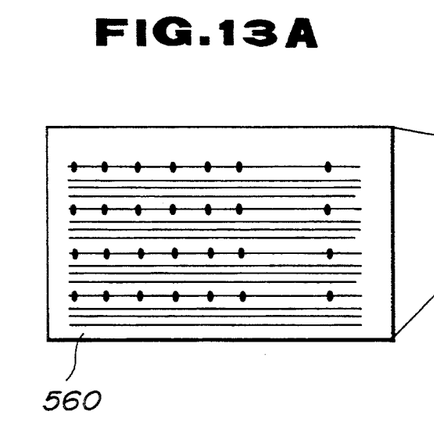
FIGS. 13a–b is an explanatory view of a relationship of an intermittent extraction of image data (pixels) and producing of the image.
Figure 13B:
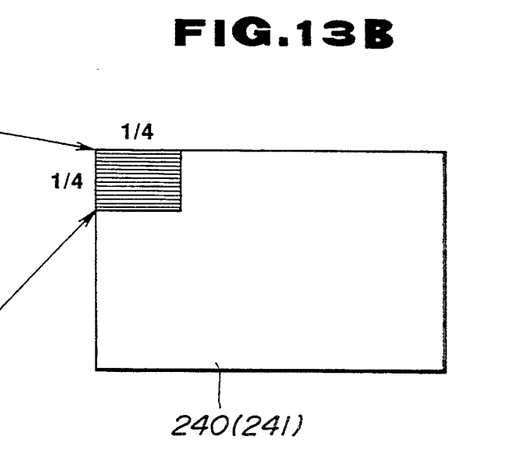

Next, when the output signal of the AND gate circuit 520 is turned OFF during the vehicle's reverse movement, as shown in FIG. 13a–b, the image data in the lateral direction of the image memories 570, 571 are extracted, neglecting one point (pixel) of image data from the series of the four points of image data (four pixels) and those in the longitudinal direction of the image memories 570, 571 are extracted, neglecting one point of image data from the series of the four points (pixels).

The liquid crystal televisions are set to turn on irrespective of the output signal of the AND gate circuit 520. Consequently, the image reduced by 1/16 is displayed, for example, on a right upper corner of the is screens of the liquid crystal televisions 240, 241.

The reduced image of the liquid crystal televisions 240, 241, front field of view from the combining glasses 260, 261, the remaining image on the liquid crystal televisions 260,261 are introduced toward the eyes of the driver adjacent to the ocular windows 250, 251.

In this way, during the vehicular stop and forwarding of the vehicle, the rearward scenery is produced on the right corner of the driver's field of view superimposed on the front view of field. On the other hand, during the reverse of the vehicle, the image on the rearward scenery is displayed on the whole screen of the field of view.

During the forward run of the vehicle, the switcher 560 causes the video signal of the right and left television cameras 100, 101 to be reversed so as to input the reversed image to the image memories 570, 571. The direction of scanning is reversed from the rightward direction to the leftward direction and vice versa. Thus, the driver can view the same image in terms of the solid image as viewed via rear view mirrors generally located outside of vehicular doors.

When the reverse of the vehicle is carried out, the-scanning direction is not reversed. As described above, if the signal of the right television camera 101 as viewed from the vehicular rearward direction corresponds to the driver's right eye and the signal of the left television camera 100 corresponds to the left eye, the rearward scenery can be viewed as if the vehicle were driven to be forwarded.

In the other preferred embodiment described above, since during the forward movement of the vehicle the scenery of the rearward direction is always superposed on the front field of view, it is not necessary to move the line of sight toward a inner roof (so called room mirror) mirror or toward a door mirror in order to recognize the rearward scenery.

At this time, when the illumination signal is received from the illumination photometer 800 and the surrounding vehicle is bright (for example, it is daytime), the transmissivity control block 530 lowers the transmissivities of the half mirrors 210, 211 made of the electrochromics. When the surrounding vehicle is dark, the transmissivities thereof are made high. Therefore, the video images of the liquid crystal televisions can clearly be viewed during the day time with the forward scenery darkened. In addition, for example, during night time, the forward scenery can clearly be viewed.

It is noted that, in place of varying the transmissivities of the half mirrors, a brilliance control block 530' may be installed which controls the brilliance of the screens of the liquid crystal televisions 240, 240', as shown in dot lines of FIG. 12.

Then, upon receipt of the signal from the illumination photometer and determining that the surrounding brightness gives dark, the brilliance of the liquid crystal television is reduced so that the forward scenery can clearly be viewed. When the surrounding brightness of the vehicle is high, the brilliances of the liquid crystal televisions are made high so that the image on the liquid crystal televisions can clearly be viewed. When the surrounding condition is bright, the brilliance is increased so that the images on the liquid crystal televisions can clearly be viewed.

Figure 14A:
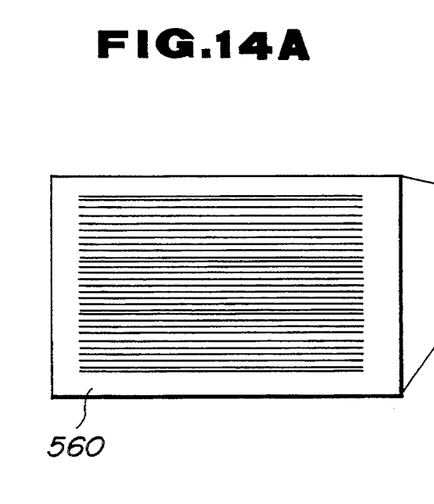
FIGS. 14a–b is an explanatory view of another relationship between the intermittent extraction of image data (pixels) and producing of the image.
Figure 14B:
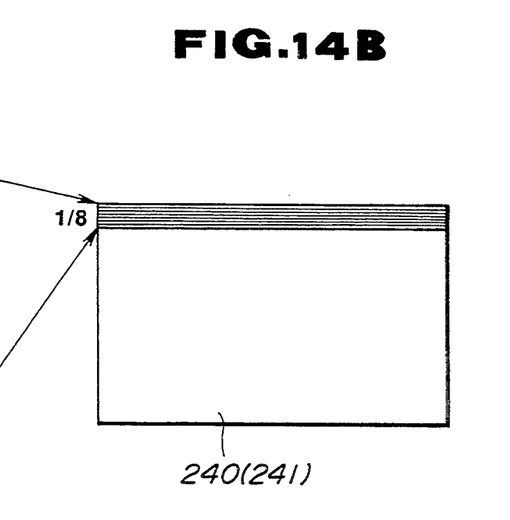

It is also noted that a region of the screen through which the rearward scenery is produced during the forward movement of the vehicle is not only the right upper corner but also the video image reduced by ⅛ may be displayed on upper ends or lower ends of the screens off the liquid crystal televisions 240, 241 as shown is FIGS. 14a–b In addition, the present invention is applicable to the vehicular surrounding information producing apparatus. The present invention is also applicable to the producing of a road guide, road information, or various additive value information which can be displayed in the three dimensional image.

In this case, the information corresponding to each of the right eye and left eye may be generated with parallax taken into account. To receive and process the supplied information, a computer which provides a high speed vector calculation function and facilitates coordinate conversions may be used.

Furthermore, the control of the transmissivity or image screen brilliance according to the surrounding brightness using the illumination photometer has been explained in the other preferred embodiment in which the second visual information is reduced and displayed on the particular portion of the screen. It is practical in a case where the first image and second image are wholly superposed and displayed.

As described hereinabove, since the two different visual pieces of information are selectively produced as the first image and second image, either of the images or both images which can be superposed on each other can be viewed. At this time, the driver needs not to move the line of sight. When both images are superposed, the second image can be produced in terms of solid angle , thus the driver can easily recognize the mutually different images of visual information.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A visual information supplying apparatus, comprising:
    a) first providing means for providing first visual information;
    b) first displaying means for displaying the first visual information in a form of a first image;
    c) second providing means for providing second visual information including the visual information for one eye of a human and for the other eye of the human;
    d) second displaying means for displaying the second visual information in the form of a three-dimensional second image;
    e) producing means, coupled to said first and second displaying means, capable of producing respective said first image and said second image independently or superimposing one of said first image and said second image on the other for a viewer;
    f) switching signal generating means, coupled to said producing means, for generating and outputting a switching signal depending on which one of the first and second images is selected to be displayed on the producing means;
    g) image controlling means, coupled to said producing means and said switching signal generating means, for controlling the producing means so as to selectively produce either or both of the first and second image for the viewer on the basis of the switching signal,
    wherein said visual information supplying apparatus is mounted on a moving object and wherein said first displaying means includes a combining glass which provides forward scenery to the viewer in the moving object directly as the first image, the forward scenery being the first visual information and wherein said second displaying means includes: a pair of camera means, installed on the moving object so as to face toward either a side direction or a rearward direction of the moving object with a spatial distance between each other, the spatial distance being set to provide substantially the same distance as the interval distance between the eyeballs of the human, for outputting the second visual information; and monitor means, installed in the moving object so as to oppose the eyeballs of the viewer for receiving the second visual information from said pair of camera means and for displaying the second visual information received from said pair of camera means in the form of the three dimensional image,
    h) a vehicle reversing detecting means for determining whether the vehicle is running rearward or not and wherein said switching signal generating means outputs the switching signal in response to a signal from said vehicle reversing detecting means from said vehicle reversing detecting means, said signal indicating whether the vehicle is running rearward or not, wherein said viewer is a vehicle driver;
    i) a head position detecting means for detecting a movement position of the head of the vehicle driver and outputting a signal indicating the movement position of the vehicle driver;

j) supporting means for pivotally supporting said pair of camera means so as to face said pair of camera means toward a desired photographing direction; and k) camera position controlling means for pivotally controlling the position of the pair of camera means via said supporting means in response to the signal indicating the movement position of the head of the driver so that the photographing direction of the pair of camera means is controlled in accordance with the head movement direction, wherein said producing means includes a mirror having a function to vary its transmissivity.

2. A visual information supplying apparatus as set forth in claim 1, wherein said moving object is a vehicle and said pair of camera means is installed on the vehicle so as to face toward the rear direction of the vehicle.

3. A visual information supplying apparatus as set forth in claim 1, which further includes illumination detecting means for detecting a brilliance of the first visual information and for outputting a signal indicating the brilliance of the first visual information and brilliance varying means for controlling the second displaying means so as to vary the brilliance of the second image according to the signal indicating brilliance of the first visual information.

4. A visual information supplying apparatus as set forth in claim 3, wherein said brilliance varying means stepwise varies the brilliance of the second visual information.

5. A visual information supplying apparatus as set forth in claim 4, wherein said pair of monitors includes a pair of liquid crystal televisions.

6. A visual information supplying apparatus as set forth in claim 5, wherein said image controlling means includes switching means for switching the second visual information to exchange the visual information for the right eye of the driver with the visual information for the left eye of the driver.

7. A visual information supplying apparatus as set forth in claim 1, which further includes illumination detecting means for detecting a brilliance of the first visual information and for outputting a signal indicating the brilliance and varying means for controlling the second displaying means so as to vary the brilliance of the second image according to the signal indicating brilliance of the first visual information.

8. A visual information supplying apparatus as set forth in claim 1, wherein said second visual information includes road guidance information or road map information.

9. A visual information supplying apparatus for a vehicle, comprising:

a) first visually displaying means for displaying a first visual information in a form of a first image against the eyes of a viewer, the first visual information being front scenery with respect to a vehicle body via a front windshield of the vehicle;

b) second visually displaying means for displaying second visual information in a form of a three dimensional second image against the eyes of the viewer, the second visual information being provided for the second visually displaying means including visual information for the viewer's right eye and visual information for the viewer's left eye, wherein said second visually displaying means includes: pair of video cameras juxtaposed to each other, said pair of video cameras having a mutual spatial distance of their lenses corresponding to a mutual eyeball distance of a human being rotatably supported on the vehicle body so as to photograph outer scenery except the front scenery and a pair of monitors receiving video signals from the pair of cameras and displaying the second image on the screens of the monitors;

c) guiding means for selectively guiding either the first image from the first visually displaying means or the second image from the second visually displaying means to the viewer, wherein the screens of the pair of monitors are faced against each other and wherein said guiding means includes: a pair of mirrors reflecting light rays from the screens of the monitors; a pair of convex lenses; and a pair of half mirrors, each half mirror having a variable transmissivity according to its drive voltage; and a pair of combining glasses for receiving and passing light rays from the first image; and a pair of ocular windows for receiving light rays from the second image reflected via the half mirrors and light rays from the first image transmitted via said pair of combining glasses and said pair of half mirrors;

d) switching signal generating means, coupled to said guiding means, for generating and outputting a switching signal depending on which one of the first and second images is selected to be guided through the guiding means; and e) image controlling means for controlling the guiding means so as to selectively guide either the first image or second image to the viewer on the basis of the switching signal.

10. A visual information supplying apparatus for a vehicle as set forth in claim 9, wherein said image controlling means controls the drive voltages supplied to said pair of half mirrors so that the pair of half mirrors selectively pass the light rays from the first image or the light rays from the second image.

11. A visual information supplying apparatus for a vehicle as set forth in claim 10, which further includes a gear position detector for detecting whether a gear position of a power transmission of the vehicle is placed at a reverse position and outputting a signal indicating that the gear position is placed at the reverse position and wherein said image controlling means controls the drive voltages of the pair of half mirrors in response to the signal indicating that the gear position is placed at a reverse position so that the reflectivities of the half mirrors are maximized and the light rays from the second image are passed to the ocular windows.

12. A visual information supplying apparatus for a vehicle as set forth in claim 11, wherein said guiding means is installed in the vehicle so that the pair of ocular windows are opposed to the eyeballs of the viewer and wherein said guiding means includes head portion movement position detecting means for detecting a head portion movement position and wherein said pair of cameras are pivoted so as to vary the photographing direction of the pair of cameras in accordance with the head portion movement direction.

13. A visual information supplying apparatus for a vehicle as set forth in claim 12, which further includes a brilliance sensor for detecting a brilliance of the first image and outputting a signal indicating the brilliance of the first image and wherein said image controlling means controls the brilliance of both of said pair of monitors according to the brilliance signal.

14. A visual information supplying apparatus for a vehicle as set forth in claim 13, wherein said viewer is a vehicle driver and said pair of cameras are pivotally supported and installed on a rear windshield of the vehicle so as to view rearward scenery of the vehicle, said second visual information being the rearward scenery.

15. A visual information supplying apparatus for a vehicle as set forth in claim 14, wherein said pair of cameras is connected to the pair of monitors, with one of the cameras for one eye of the driver changed exchanged with the other camera for the other eye of the driver.

16. A visual information supplying apparatus for a vehicle as set forth in claim 9, wherein said guiding means includes a mirror having a function to vary its transmissivitity.

17. A visual information supplying apparatus for a vehicle as set forth in claim 9, wherein said second visual information includes road guidance information or road map information.

* * * * *